United States Patent Office 2,803,146
Patented Aug. 20, 1957

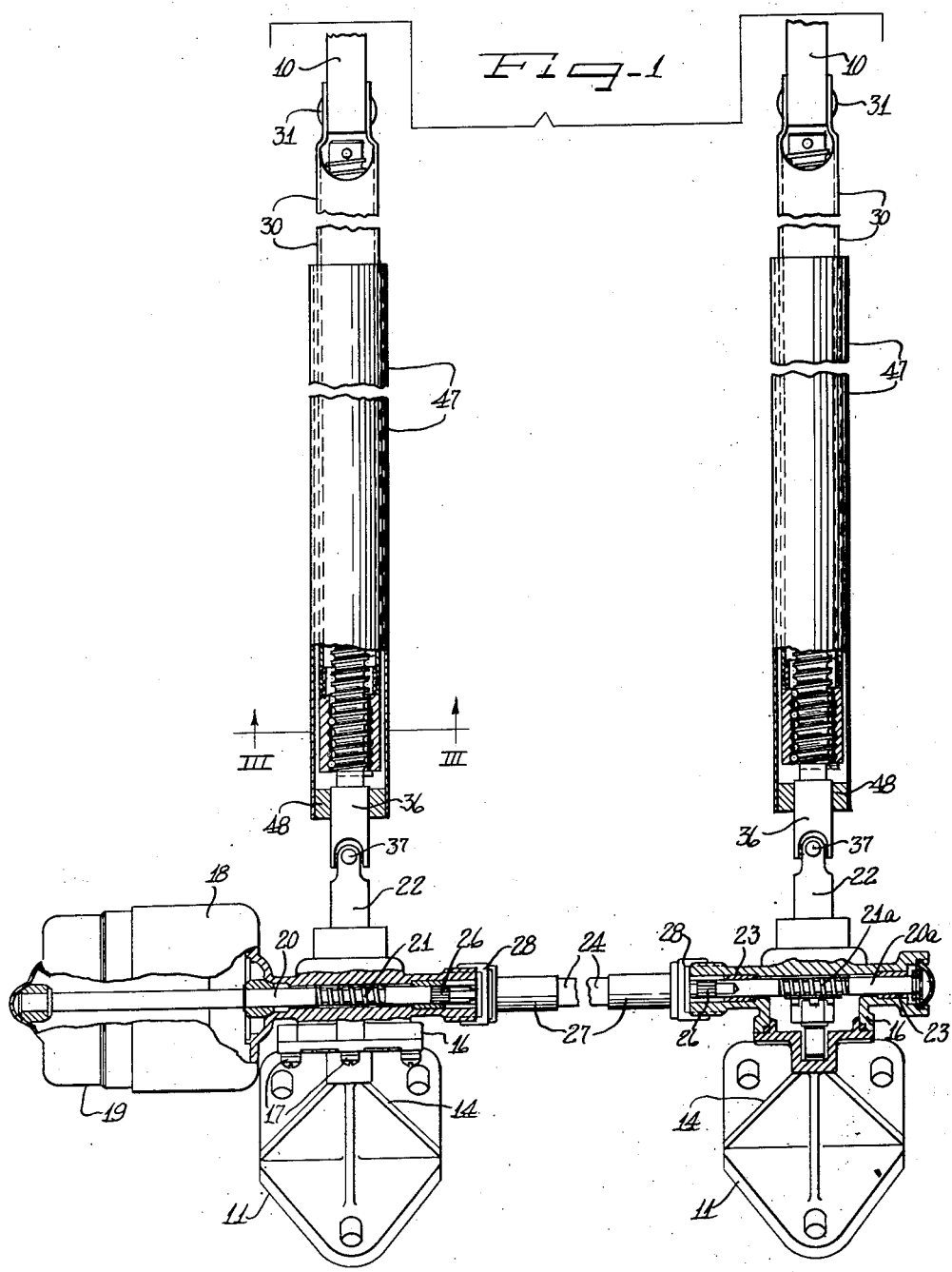

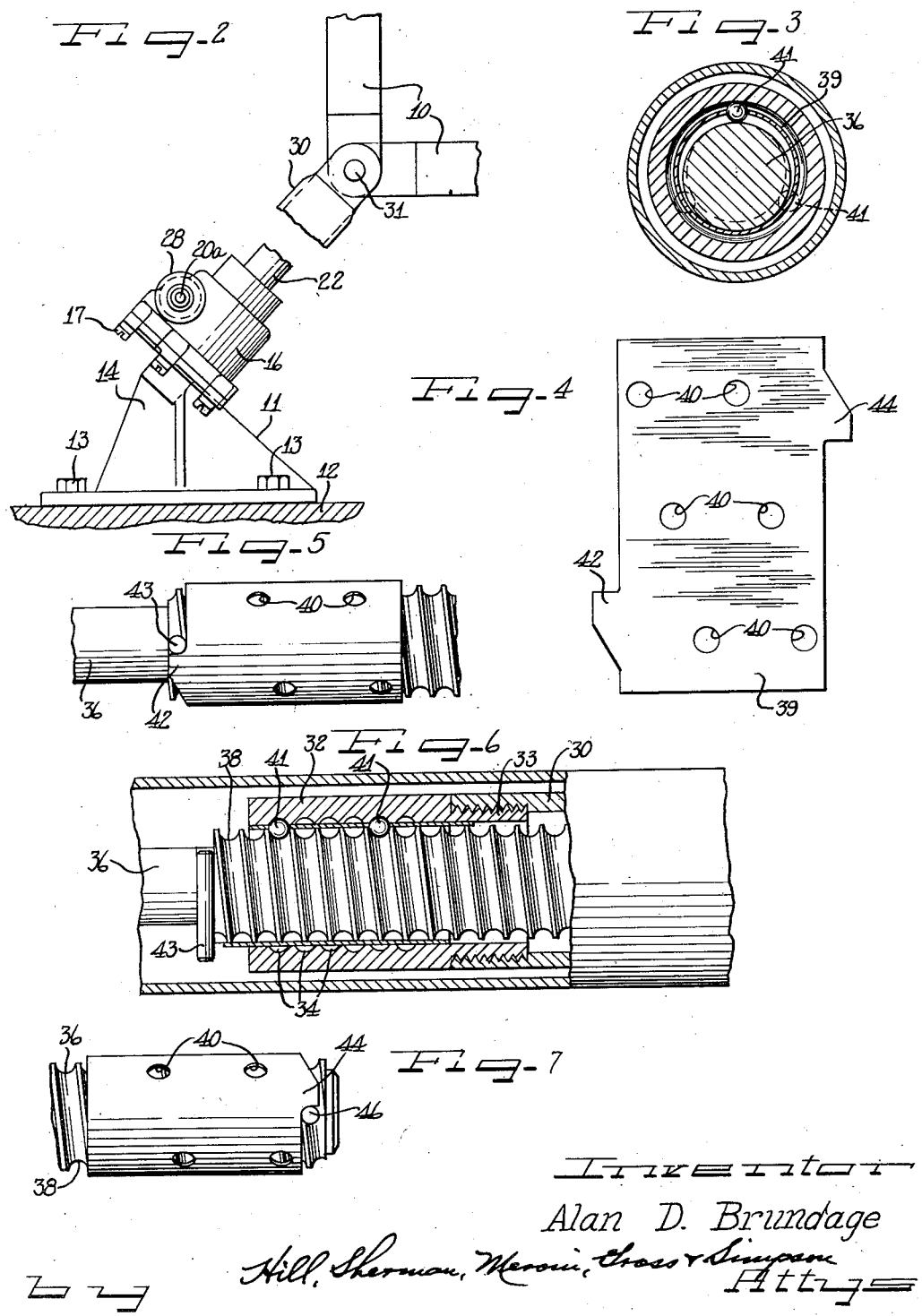

2,803,146

TOP OPERATING MECHANISM

Alan D. Brundage, Birmingham, Mich., assignor to Houdaille Industries, Inc., Detroit, Mich., a corporation of Michigan Application February 27, 1952, Serial No. 273,742

2 Claims. (Cl. 74—424.8)

This invention relates generally to top operating mechanisms for vehicles of the type having a convertible top construction and more particularly relates to an improved actuating mechanism whereby a source of power supply may be utilized to selectively rotate an actuating member in different directions to raise and lower the top, respectively, an improved clutch mechanism being provided to afford a safety feature whereby continued operation of the source of power supply in either direction will not be dangerous to personnel or equipment.

Although power operated top actuating mechanisms have been heretofore provided for vehicles having convertible top constructions, such mechanisms have frequently been characterized by the necessary provision of complicated control systems limiting the operation of the source of power in accordance with the physical position of the convertible top construction.

In accordance with the general principles of the present invention an improved actuating mechanism is provided which may be utilized in combination with a convertible top construction. A top actuating member having a generally tubular configuration is provided and includes a collar at one end having one or more internal annular grooves formed therein. A shaft having an external helical groove is extended through the collar into the actuating member and shiftable means are provided between the helical groove of the shaft and the annular groove of the actuating member to form a clutch drive connection therebetween.

A source of power supply preferably taking the form of a bracket located on each side of the vehicle with one of the brackets carrying a motor having a power take-off means rotating shaft on each bracket in unison is used to rotate the helically grooved shaft in selected direction. It will be understood that an actuating member is located on each side of the vehicle for connection to each corresponding side of the convertible top construction so that the take-off shafts on the respective brackets are each universally connected to a corresponding helically grooved shaft.

Upon selectively operating the motor, the shiftable means are movable in the helical grooves to drive the actuating members between two positions relative to the respective shafts corresponding to a top-open position and a top-closed position. The shiftable means are movable in the annular groove or grooves in the respective collars for idling in either of the two positions. Thus, the motor may be operated without damage to equipment or without danger to personnel even though the convertible top construction has been moved to an open position or a closed position by virtue of the clutch coupling between the actuating members and the respective helically grooved shafts. Moreover, the single drive motor is rigidly mounted on the vehicle and all tilting movement of the actuating members is accommodated by virtue of the universal connection effected between the helically grooved shafts and the respective power take-off shafts.

It is an object of the present invention to provide an improved actuating mechanism for a convertible top construction which overcomes the deficiencies of the prior art structures.

Another object of the present invention is to provide a convertible top construction which is power actuated and which completely eliminates the necessity of providing cutoff control system for the source of power supply.

Yet another object of the present invention is to provide a convertible top construction for a vehicle which will be safe to operate.

Many other features, advantages and additional objects of the present invention will become manifest to those versed in the art upon making reference to the detailed description which follows and the accompanying sheets of drawings in which a preferred embodiment incorporating the principles of the present invention is shown by way of illustrative example only.

Figure 1 is a fragmentary view of a top operating mechanism for a convertible top construction provided in accordance with the present invention and showing parts of the mechanism in elevation with parts broken away and with parts shown in cross-section to illustrate details of construction;

Figure 2 is a reduced side-elevational fragmentary view of the top operating mechanism shown in Figure 1;

Figure 3 is an enlarged cross-sectional view taken substantially on line III—III of Figure 1;

Figure 4 is a view showing a 360° development of a sleeve member utilized in the structural embodiment of the present invention;

Figure 5 is a fragmentary elevational view showing additional details of construction of the structure of Figure 3;

Figure 6 is an enlarged fragmentary view showing additional details of construction of the operating mechanism of Figure 1; and Figure 7 is a view similar to Figure 5, but showing the parts in a different operating position.

As shown on the drawings:

The top operating mechanism of the present invention is used to selectively raise and lower a convertible top construction for an automotive vehicle. It will be understood that the usual top construction is provided which may include one or more main pivot arms indicated at 10 and located in spaced apart relationship on opposite sides of the vehicle.

In accordance with the general principles of the present invention, a pair of brackets 11, 11 are provided, there being one bracket mounted on each side of the vehicle, a part of which is indicated at 12, there being one bracket 11 for each corresponding pivot arm 10 on the convertible top construction. The brackets 11 are firmly assembled to the vehicle 12 by means of a plurality of fasteners 13.

Each of the brackets 11, 11 includes a body portion 14 mounting a gear box 16 held in firm assembly therewith by plurality of fasteners 17.

One of the gear boxes 16 is provided with an enlarged housing portion 18 enclosing a suitable source of power such as an electric motor 19. The electric motor 19 is provided with power take-off means including a shaft 20 having a worm 21 meshed with a gear co-rotatably connected with a shaft 22 journaled in the gear box 16.

The other gear box 16 journals a corresponding shaft 22 having a gear co-rotatable therewith and being driven by a worm 21a on a shaft 20a journaled in a pair of bearings 23 and adapted to be rotatably driven by a flexible shaft 24 extending between the gear boxes 16, 16 and having a splined connection with each of the shafts 20 and 20a as is indicated at 26.

The flexible shaft 24 is preferably of well known construction and includes the usual sheathing 27 and coupling components 28 so as to be firmly assembled on each of the gear boxes 16, 16 of the brackets 14, 14.

The mechanism connected between the main pivot arms 10 and each of the shafts 22 is identical so similar reference numerals will be used in the description of only one of the devices.

A generally tubular elongated actuating member 30 is firmly connected to the main pivot arm as by means of a rivet 31. At the other end of the actuating member 30 is provided a collar 32 having an exteriorly threaded reduced diameter neck 33 firmly engaged with a correspondingly threaded open end of the actuating member 30. The collar is provided with a plurality of parallel annular grooves 34 aligned in longitudinal spaced arrangement.

A shaft 36 is connected for co-rotation with the shaft 22 by means of a universal joint 37 and has one end thereof extending through the collar 32 and into the actuating member 30.

The shaft 36 is exteriorly threaded, for example, a helical groove 38 is provided which extends a substantial portion of the length of the shaft 36.

Shiftable means are provided between the shaft 36 and the collar 32 to cooperate with the grooves 34 and the helical groove 38, thereby to form a driving clutch for moving the actuating member 30 axially relative to the shaft 36 upon rotation of the shaft 36. In the particular embodiment herein described, the shiftable means include a retainer sleeve 39 having a plurality of apertures 40 formed therein. As shown in Figure 4, the apertures 40 preferably comprise three pairs of apertures relatively offset longitudinally to match the lead of the helical groove 38 on the shaft 36. The sleeve 39 is conveniently formed by bending a flat sheet of material similar to that shown in Figure 4 into a sleeve-like form as shown in Figures 5 and 7 so that the inner diameter of the sleeve 39 closely approximates the outer diameter of the threaded portion of the shaft 36.

A ball 41 is received by each of the apertures 40, the portion of each ball 41 extending outwardly of the sleeve 39 being received in one of the annular grooves 34 formed in collar 32 and the portion of each ball 41 extending inwardly in the sleeve 39 being seated in a portion of the helical groove 38.

It will be noted that the sleeve 39 is provided with an ear 42 arranged to engage a stop pin 43 carried by the shaft 36 at one end of the helical groove 38.

The sleeve 39 is further provided with an ear 44 located on the other end thereof which is adapted to engage a stop pin 46 carried by the shaft 36 at the other end of the helical groove 38.

When the shaft 36 is rotated, the balls 41 will move in the helical groove 38, and the sleeve 39, together with the collar 32 and the actuating member 30, will be translated linearly so as to be relatively displaced or extended with respect to the shaft 36.

As soon as the limits prescribed by the end of the helical groove 38 have been reached, the balls 41 will move through the annular grooves 34 so that relative rotation will occur between the collar 32 and the sleeve 39, together with the shaft 36, and the balls 41. Thus, the drive motor will, in effect, idle even though the actuating member 30 has been moved as far as possible in one direction with respect to the shaft 36.

The end positions of the collar 32, the sleeve 39 and the shaft 36 are clearly defined by the stop pins 43 and 46 since the ear 42 of the sleeve 39 will engage the stop pin 43 at one end of the helical groove and the ear 44 will engage the stop pin 46 at the other end of the helical groove 38. The two end positions, of course, correspond to a top open and a top closed position.

The top operating mechanism thus provided is particularly safe to operate both with respect to the equipment involved as well as to the operating personnel since no harm can come from operating the motor 19 longer than is necessary to move the parts to a fully extended or fully collapsed position. The shiftable means provided between the threaded shaft 36 and the grooved collar 32 drive the actuating member between the two positions relative to the shaft 36 corresponding to a top open position and a top closed position and move in the annular grooves 34 of the collar 32 so that idling of the motor 19 may occur at the top open position and at the top closed position. Thus, a simple control means may be provided to selectively operate the motor 19 and it is completely unnecessary to incorporate a complicated cut-off control to deenergize the motor 19 after the convertible top construction has been physically moved to adjusted position.

To enclose the threaded portion of the shaft 36 likely to be exposed upon relative extension of the shaft 36 with respect to the actuating member 30, a housing 47 is provided of generally tubular configuration, the housing 47 being provided with a reduced neck portion 48 to substantially close the end thereof.

Although various minor structural modifications might be suggested to those versed in the art, it should be understood that I wish to embody within the scope of the patent warranted hereon all such modifications as reasonably and properly come within the scope of my contribution to the art.

I claim as my invention:

1. In combination, a pair of actuators for an automotive top lift, each actuator including a housing, means for supporting said housing on a stationary support, a screw shaft rotatably supported at one end by said housing but fixed against axial movement with respect to said housing, a worm gear fixed to said screw shaft, a worm meshing with said worm gear within said housing, an actuator collar including an apertured sleeve and having ball means retained by said sleeve and said collar movable on said screw shaft, limit stop members carried by opposite ends of said screw shaft, said sleeve being engageable with said stop members to thereby limit the travel thereof, an actuating member operatively connected at one end to said actuator collar, means for connecting the other end of said actuator member to a top lift linkage or the like and for holding said actuating member against rotation relative to said linkage, an electric motor operatively connected to one of said worms, the other of said worms having a driven connection with said one worm through a flexible shaft for unison operation of both of said actuators, and means effecting a connection between said screw shaft, said actuating member, and said sleeve of each actuator permitting relative rotation of said sleeve and said actuating member upon engagement of said sleeve with either of said limit stop members, whereby said sleeve will rotate together with said screw shaft to mechanically release load on said motor, said screw shaft comprising a two part construction wherein a drive shaft member is rotatably journaled in said housing and an actuating shaft member has a universal joint connection with said drive shaft member outside of said housing for rocking movement of said actuating shaft member to accommodate body assembly tolerances.

2. The combination according to claim 1, said motor being supported by said housing in stationary relation to the rocking movement of said actuating member and said screw shaft, and an antifriction thrust bearing within said housing at one end of said worm.

References Cited in the file of this patent

UNITED STATES PATENTS

| | | |
|---|---|---|
| 954,288 | Timby | Apr. 5, 1910 |
| 1,891,545 | Kindervator | Dec. 30, 1922 |
| 2,264,602 | Westrope | Dec. 2, 1941 |

(Other references on following page)

UNITED STATES PATENTS

| | | |
|---|---|---|
| 2,306,348 | Spear | Dec. 22, 1942 |
| 2,329,802 | Westrope | Sept. 21, 1943 |
| 2,372,583 | Keller | Mar. 27, 1945 |
| 2,446,393 | Russell | Aug. 3, 1948 |
| 2,479,019 | Ochtman | Aug. 16, 1949 |
| 2,540,454 | Milhan | Feb. 6, 1951 |
| 2,558,926 | Bramble | July 3, 1951 |

FOREIGN PATENTS

| | | |
|---|---|---|
| 117,315 | Canada | Aug. 12, 1943 |